US007571305B2

(12) United States Patent
Piry et al.

(10) Patent No.: US 7,571,305 B2
(45) Date of Patent: Aug. 4, 2009

(54) REUSING A BUFFER MEMORY AS A MICROCACHE FOR PROGRAM INSTRUCTIONS OF A DETECTED PROGRAM LOOP

(75) Inventors: Fredrick Claude Marie Piry, Cagnes-sur-Mer (FR); Louis-Marie Vincent Mouton, Vallauris (FR); Stephane Eric Sabastien Brochier, Chateauneuf de Grasse (FR); Gilles Eric Grandou, Plascassier (FR)

(73) Assignee: ARM Limited, Cambridge (GB)

( * ) Notice: Subject to any disclaimer, the term of this patent is extended or adjusted under 35 U.S.C. 154(b) by 209 days.

(21) Appl. No.: 11/652,148

(22) Filed: Jan. 11, 2007

(65) Prior Publication Data

US 2008/0172547 A1    Jul. 17, 2008

(51) Int. Cl.
*G06F 9/40* (2006.01)
(52) U.S. Cl. ...................................................... 712/241
(58) Field of Classification Search ................. 712/241
See application file for complete search history.

(56) References Cited

U.S. PATENT DOCUMENTS

2005/0015537 A1*    1/2005    Asaad et al. ................... 711/2

OTHER PUBLICATIONS de Alba et al., *Path-based Hardware Loop Prediction*, 10 pages.
Reinman et al., *Optimizations Enabled by a Decoupled Front-End Architecture*, 32 pages.

* cited by examiner

*Primary Examiner*—William M Treat
(74) *Attorney, Agent, or Firm*—Nixon & Vanderhye P.C.

(57) ABSTRACT

A data processing system 2 includes an instruction cache 6 having an associated buffer memory 18, 8. The buffer memory 18, 8 can operate in a buffer mode or in a microcache mode. The buffer memory is switched into the microcache mode upon program loop detection performed by loop detector circuitry 20. When operating in the microcache mode, instruction data is read from the buffer memory 18, 8 without requiring an access to the instruction cache 6.

21 Claims, 3 Drawing Sheets

REUSING A BUFFER MEMORY AS A MICROCACHE FOR PROGRAM INSTRUCTIONS OF A DETECTED PROGRAM LOOP

BACKGROUND OF THE INVENTION

1. Field of the Invention

This invention relates to data processing systems. More particularly, this invention relates to the provision in a data processing system of a microcache for storing instruction data for a program loop.

2. Description of the Prior Art

It is known to provide a microcache within data processing systems. Such microcaches are described in the paper "Optimizations Enable By a Decoupled Front-End-Architecture" by Glenn Reinman et al. Microcaches are small, fast and low power storage mechanisms that can be used to store a small amount of instruction data, typically instruction data having a high probability of use. The provision of a microcache nevertheless represents an overhead in terms of circuit area and power.

It is also known within the field of microprocessors to provide hardware loop detection/prediction for various purposes. An example of such loop prediction is as discussed in "Path-based Hardware Loop Prediction" by Marcos R. de Alba et al. Such loop predictors can be usefully employed as part of the branch prediction mechanisms within microprocessors for predicting program flow and accordingly allowing high levels of instruction parallelism and instruction data prefetch.

The Xscale microprocessors produced by Intel Corporation incorporate a general array of cache line size buffers. These buffers can be used as store buffers, forwarding buffers, merge buffers, eviction buffers, linefill buffers, etc. Whenever a processing request arises that needs a buffer, then the next available general purpose buffer is allocated.

SUMMARY OF THE INVENTION

Viewed from one aspect the present invention provides apparatus for processing data, said apparatus comprising:
a cache memory;
a buffer memory coupled to said cache memory and arranged to operate in either:
(i) a buffer mode buffering instruction data associated with accesses to said cache memory; or
(ii) a microcache mode storing instruction data, accesses to said instruction data being made from said buffer memory without an associated access to said cache memory;
a loop detector responsive to memory addresses of instructions to detect program loops; and
buffer control circuitry coupled to said loop detector and said buffer memory and responsive to detection of a program loop by said loop detector to switch said buffer memory from operating in said buffer mode to operating in said microcache mode with instruction data for at least a portion of said program loop being stored within said buffer memory.

The present technique recognizes that a data processing system will typically include a cache memory for storing instruction data as well as a buffer memory provided for buffering instruction data in various ways in association with accesses to that instruction data in the cache memory. In the context of such a system, the present technique provides a loop detector mechanism which detects program loops and switches the buffer memory from being used in its normal buffer mode to instead function as a microcache in a microcache mode storing instruction data corresponding to instructions within the detected program loop. Accesses to at least some of the instructions within that detected program loop can then be made to the microcache instead of being made to the larger cache memory. The buffer memory is reused as a microcache thus keeping the overhead associated with the provision of the microcache operation low, whilst the hardware loop detector enables the exploitation of this technique to be transparent to the programmer.

The loop detector can detect program loops in a variety of different ways. A low-overhead and simple way of detecting loops is to detect non-sequential fetches of instructions from a memory address at a backward location relative to the normal program flow. Such non-sequential and backward instruction fetches are indicative of a program loop and can be used to switch the buffer memory from the buffer mode to the microcache mode. The range of the backward jump associated with this type of loop detection may be limited as jumps that are long are less likely to correspond to program loops and may instead be a more general redirection of program flow to another portion of the program.

In modern high performance microprocessors it is known to provide prefetch circuitry coupled to an external memory for prefetching instruction data. Such prefetch circuitry will typically include branch prediction circuitry for predicting program flow and this branch prediction circuitry can be at least partially reused to provide the loop detection circuitry as branches predicted by such branch prediction circuitry are an integral part of many program loops.

When switched into the microcache mode, the buffer control circuitry can control the buffer memory such that instruction data to be read from the cache memory is stored in the buffer memory. Such storage into the buffer memory then makes that instruction data available upon subsequent iterations of the program loop directly from the buffer memory without any cache accesses being necessary.

It will be appreciated that the buffer memory may not be sufficiently large to store all of the instruction data corresponding to a program loop. Nevertheless, the present technique may still be used with the buffer memory storing at least some of the program loop code and saving power in association with accesses thereto; the remainder of the program code can be stored in the cache memory.

The buffer memory can store one or more values indicative of a memory address of instruction data stored therein to facilitate its operation as a microcache, i.e. to permit address matching.

It will be appreciated that the buffer memory which is controlled by the loop detector to operate either in the buffer mode or in the microcache mode can be provided in a number of different ways and have a number of different functions in its buffer mode of operation. Example functions of the buffer memory include a linefill buffer or a prefetch buffer associated with the cache memory. Another possible use of the buffer memory is as a decoupling buffer storing data read from the cache memory for execution downstream in an instruction pipeline, e.g. a FIFO decoupling buffer memory.

When the buffer memory is operating as a prefetch buffer, some instruction data speculatively fetched into the buffer memory may not be written into the cache memory, but is nevertheless associated with potential cache accesses. The association between the instruction data buffered within the buffer memory in the buffer mode and accesses to the cache memory can have a wide variety of different forms, e.g. linefill, speculative prefetching, decoupling upon cache read, etc.

Viewed from another aspect the present invention provides apparatus for processing data, said apparatus comprising:
  a cache memory means;
  a buffer memory means coupled to said cache memory means for operating in either:
    (i) a buffer mode buffering instruction data associated with accesses to said cache memory means; or
    (ii) a microcache mode storing instruction data, accesses to said instruction data being made from said buffer memory means without an associated access to said cache memory means;
  loop detector means for detecting program loops in response to memory addresses of instructions; and
  buffer control means coupled to said loop detector means and said buffer memory means for switching, in response to detection of a program loop by said loop detector, said buffer memory means from operating in said buffer mode to operating in said microcache mode with instruction data for at least a portion of said program loop being stored within said buffer memory means.

Viewed from a further aspect the present invention provides a method of processing data, said method comprising the steps of:
  storing instruction data within a cache memory;
  storing instruction data within a buffer memory coupled to said cache memory and arranged to operate in either:
    (i) a buffer mode buffering instruction data associated with accesses to said cache memory; or
    (ii) a microcache mode storing instruction data, accesses to said instruction data being made from said buffer memory without an associated access to said cache memory;
  in response to memory addresses of instructions, detecting program loops; and
  in response to detection of a program loop, switching said buffer memory from operating in said buffer mode to operating in said microcache mode with instruction data for at least a portion of said program loop being stored within said buffer memory.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
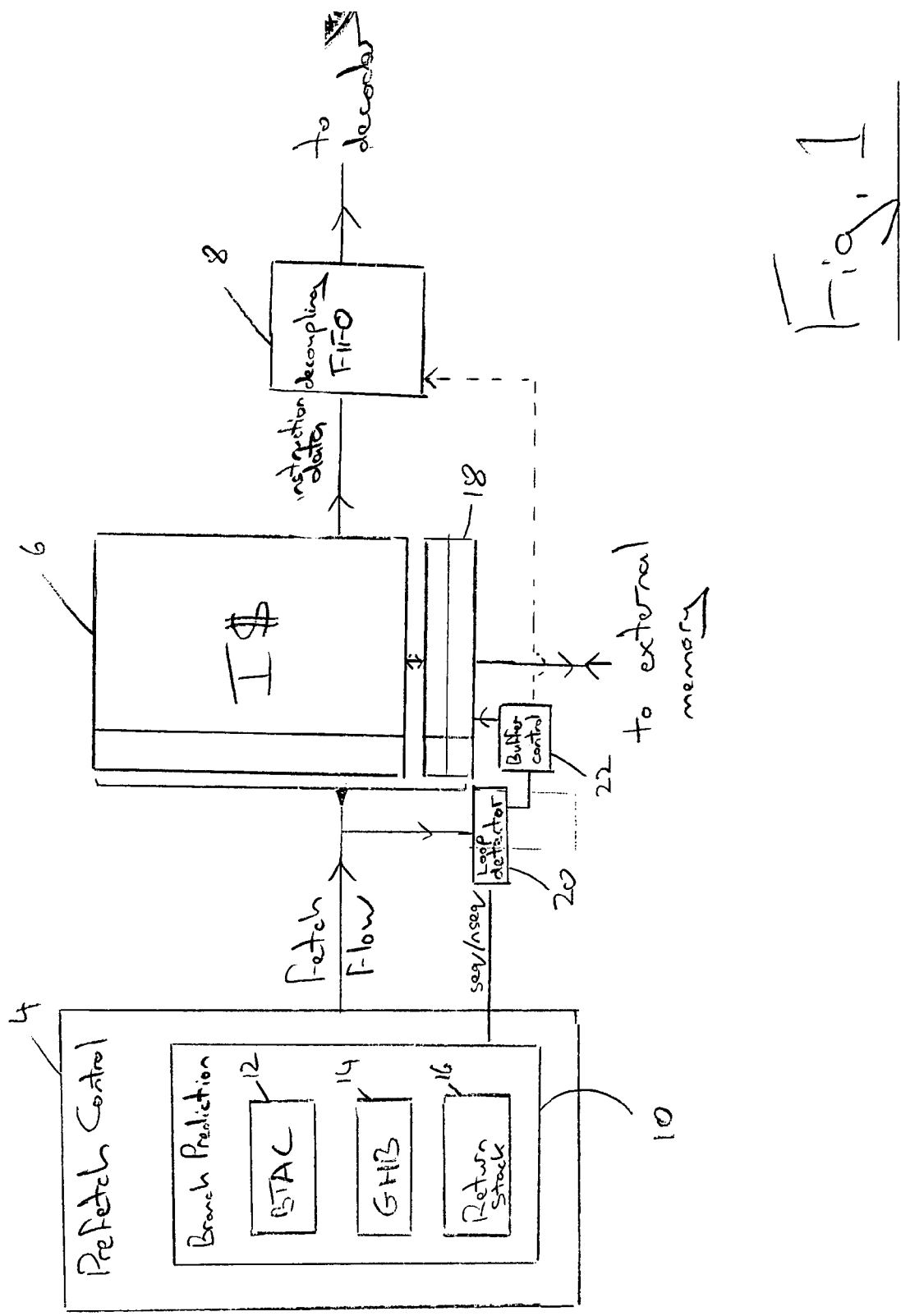
FIG. 1 schematically illustrates a prefetch stage within an instruction pipeline of a data processing system.

FIG. 1 illustrates a prefetch unit 2 which forms part of a data processing apparatus such as programmable microprocessor. It will be appreciated that such a prefetch unit 2 typically forms a part of an instruction pipeline within a data processing system and the data processing system will include many further circuit elements. These other circuit elements are not related to the present technique and for the sake of clarity are not illustrated in FIG. 1.

The prefetch unit 2 includes prefetch control circuitry 4, an instruction cache 6 and a decoupling buffer FIFO memory 8. The prefetch control unit 4 includes a branch predictor 10, which in turn includes a branch target address cache 12, a global history buffer 14 and a return address stack memory 16. It will be appreciated that the branch prediction mechanism 10 can include other combinations of elements as many different forms of branch prediction are known and suited to differing circumstances.

A linefill/prefetch buffer 18 is provided in association with the instruction cache 6 and serves to either provide a linefill function or a prefetch function to the instruction cache 6. When some instruction data is identified by the prefetch control unit 4 as forming part of the instruction fetch flow to be provided to an instruction decoder (downstream and not illustrated), then fetch flow information specifying the memory addresses of the instruction data concerned is passed to the instruction cache 6. A cache miss or a cache hit may occur within the instruction cache 6. If a cache miss occurs, then the instruction data is fetched from an external memory via the buffer memory 18 operating in a linefill mode in accordance with normal linefill techniques. The buffer memory 18 in this example embodiment has two lines, each of the same storage capacity as one cache line within the instruction cache 6. It is also possible that a buffer memory 18 may be provided with a storage capacity corresponding to a single cache line.

Another function of the prefetch control unit 4 is to speculatively prefetch instruction data managed by the instruction cache 6. In the case of a cache miss prefetch is initiated for the line following that which gave rise to the miss as there is a high probability it will be required, even if a branch is predicted to another point. In such a prefetch mode, the identified instruction data may be fetched from the external memory into the buffer memory 18, but not stored within the instruction cache 6 until the fetch flow indicates that such instruction data falls within the program flow and is to be passed to the decoder via the decoupling buffer FIFO memory 8.

The instruction data identified by the fetch flow signals from the prefetch control unit 4 is supplied from the instruction cache 6 (or from the buffer 18) to the decoupling buffer FIFO memory 8 where it is stored as an ordered sequence of instruction data to be passed to an instruction decoder. The instruction decoder parses the instruction data to identify the individual instructions therein and subject these to at least partial instruction decoding.

Also illustrated in FIG. 1 are loop detector circuitry 20 and buffer control circuitry 22. The loop detector circuitry 20 is responsive to a signal generated by the branch prediction unit 10 indicating whether or not the next instruction data identified for fetching corresponds to a sequential or a non-sequential instruction fetch, i.e. sequential instruction fetches correspond to the normal incrementing of a program counter value in accordance with a sequential flow of program instructions. A non-sequential indication corresponds to a branch operation which causes a jump in program flow. This jump may be forward relative to the normal program flow direction or backward relative to the normal program flow direction. The loop detector 20 is responsive to the fetched flow signals indicative of the memory addresses being fetched to identify backward jumps, i.e. non-sequential fetches to a memory address which is backward relative to the normal program flow direction. The loop detector 20 can also determine the magnitude of such backward jumps (i.e. the difference in memory address values) and compare this with a predetermined threshold value to determine whether or not the non-sequential backward jump should be interpreted as a program loop. Backward jumps greater than a threshold magnitude are less likely to correspond to program loops and accordingly may not be identified as such, rather they may more generally relate to redirections of program flow on a larger scale. The sequential signal is not mandatory as the loop detector could instead gain this invention by analysing the address sent by the prefetch control unit 4 to the instruction cache 6.

Buffer control circuitry 22 is responsive to a signal from the loop detector circuit 20 identifying from the fetch flow and the sequential/non-sequential signal that a program loop has been encountered to generate a signal supplied to the buffer memory 18 to switch the buffer memory 18 into a microcache mode. In this microcache mode the instruction data to be supplied to the downstream elements in the instruction pipeline as identified by the fetch flow are read from within the buffer memory 18 (after checking for a match against an address stored within the buffer memory 18) instead of being read from the instruction cache 6. Accordingly, accesses to the instruction cache 6 are suppressed within such a microcache mode to save power.

If the instructions to be fetched miss within the buffer memory 18 in the microcache mode, then a lookup is made within the full instruction cache 6. This allows for the situation in which the buffer memory 18 can only store part of the instruction data corresponding to a program loop encountered and for the initial loading of instruction data in to the microcache. Nevertheless, for the part of the instruction data which is able to be stored within the buffer memory 18, a saving in power is made by not having to make accesses to the instruction cache 6.

When the branch prediction unit 10 indicates the end of the program loop behaviour (e.g. the global history buffer 14 determines from its pattern of stored branch outcomes that the end of a loop has been reached), then this is signalled to the loop detector 20 which in turn signals the buffer control circuitry 22 to switch the buffer memory 18 back from microcache mode to buffer mode, in which the buffer memory 18 acts as a normal linefill/prefetch buffer. When the buffer memory 18 first enters the microcache mode, then it will typically not contain the instruction data for the program loop which has been detected. In this case, when a miss occurs within the buffer memory 18, the data read from the instruction cache 6 will also be stored into the buffer memory 18 in the microcache mode such that subsequent accesses to that instruction data in subsequent program loop iterations will be satisfied by a read from the buffer memory 18 without requiring an access to the full instruction cache 6.

Figure 2:
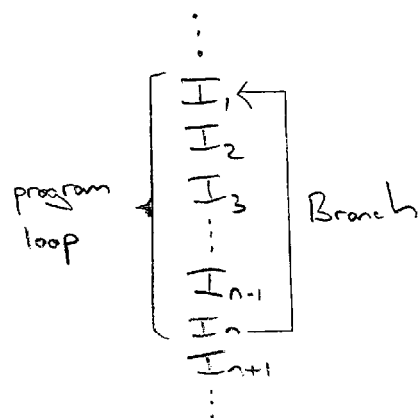
FIG. 2 schematically illustrates a program loop within a sequence of program instructions.

FIG. 2 schematically illustrates a sequence of program instructions. A branch instruction $I_n$ causes a backward jump in program flow to instruction $I_1$. Such a backward jump is a non-sequential access and will decrease the program counter value, whereas the normal sequential accesses increase the program counter value. The branch illustrated spans a certain range of memory addresses between instruction $I_n$ and instruction $I_1$. The loop detector circuitry 20 is arranged to interpret such backward jumps as loops if the magnitude of the background jump is less than a predetermined magnitude.

Figure 3:
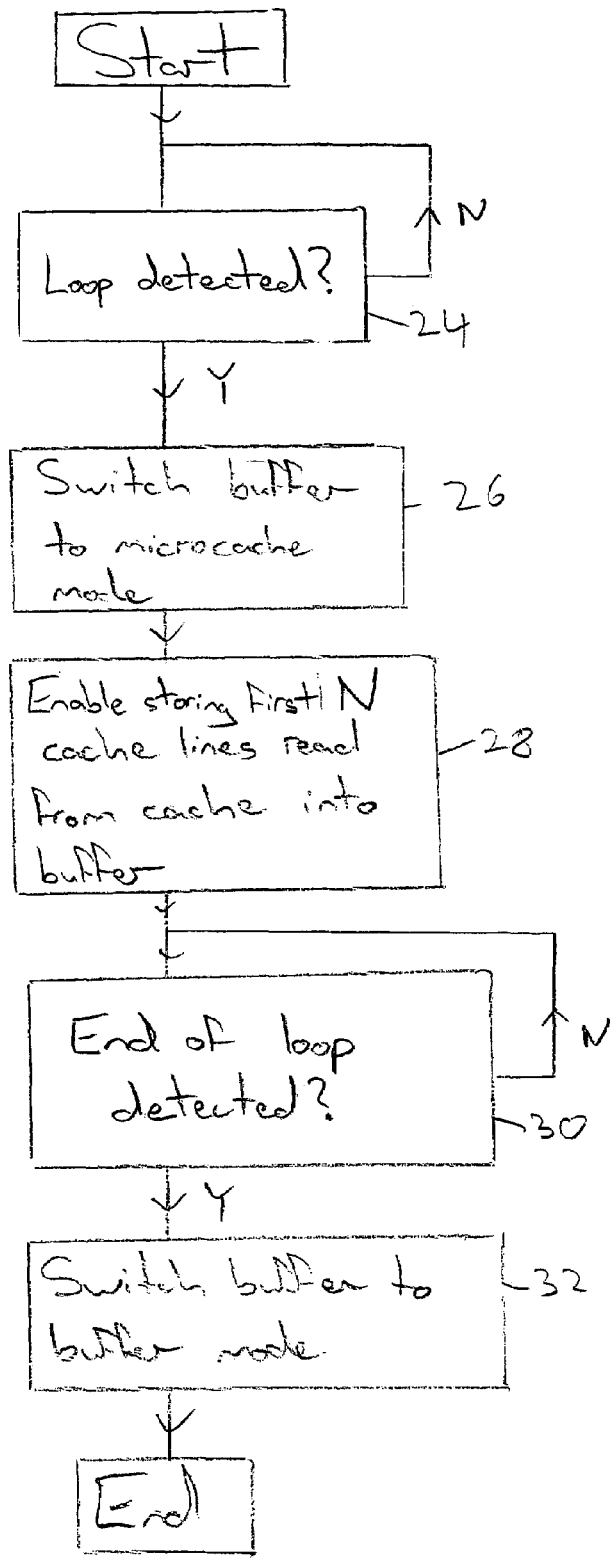
FIG. 3 schematically illustrates the operation of buffer control circuitry in switching a buffer memory into and out of microcache mode.

FIG. 3 is a flow diagram schematically illustrating the action of the buffer control circuitry 22 in controlling the buffer memory 18 to switch into and out of the microcache mode. At step 24 the buffer control circuitry 22 waits for a loop to be detected (e.g. detected by the loop detector circuitry 20). At step 26, upon detection of a loop, the buffer control circuitry 22 signals the buffer memory 18 to switch into the microcache mode. At step 28, the buffer control circuitry 22 enables the buffer memory to store the first N cache lines read from the instruction cache 6 into the buffer memory should a miss occur within the buffer memory 18. This is a linefill for the buffer memory 18 from the instruction cache 6. At step 30, the buffer control circuitry 22 waits for end of loop behaviour to be detected. Upon such detection, step 32 switches the buffer memory 18 back to the buffer mode where it acts as a normal linefill/prefetch buffer.

Returning to FIG. 1, it will be seen that there is shown a dotted line control signal passed from the buffer control circuitry 22 to the decoupling buffer FIFO memory 8. In an alternative embodiment, instead of controlling the buffer memory 18 to operate in either the buffer mode or the microcache mode, the buffer control circuitry 22 can instead control the decoupling buffer FIFO memory 8 to either operate in its normal buffer mode (i.e. as a decoupling buffer FIFO) or in a microcache mode in which fetch flow identified by the prefetch control unit 4 is satisfied by a sequence of reads from the decoupling buffer FIFO memory 8. It will be appreciated that when operating in this microcache mode, the decoupling buffer FIFO memory does not operate in a strict first-in-first-out sequence with the loop code instead being drawn from the storage locations within the buffer memory 8 as necessary.

Figure 4:
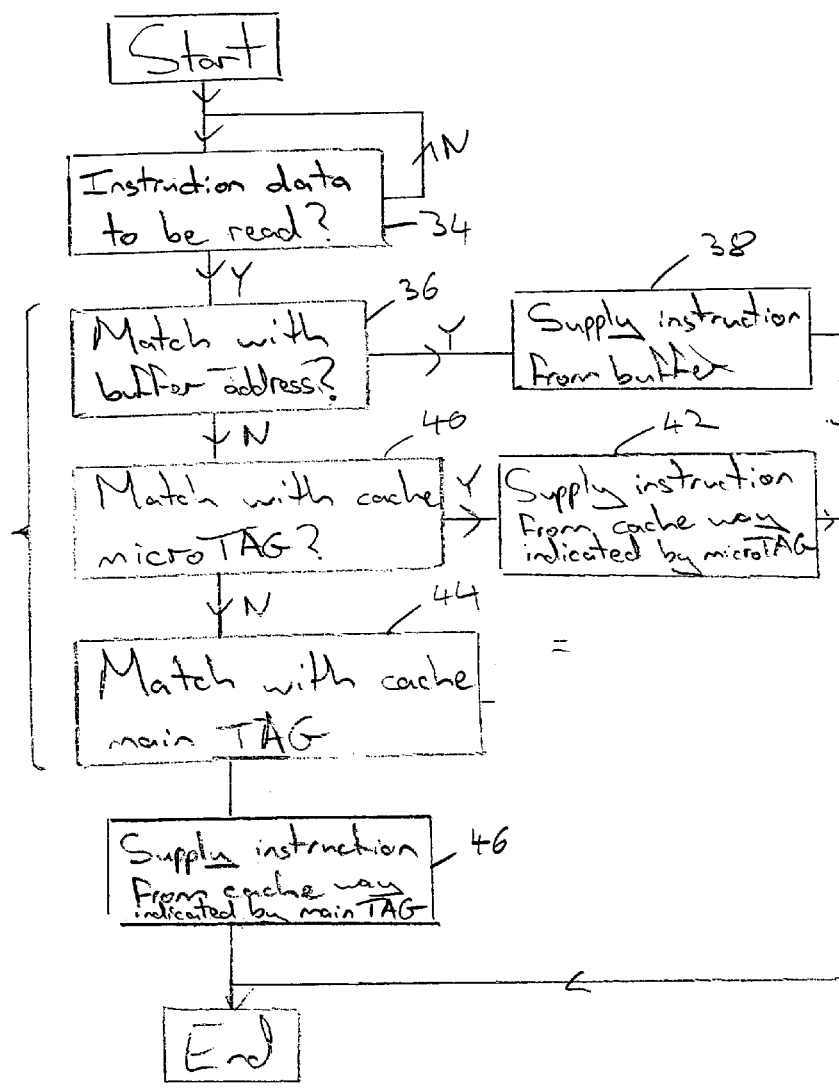
FIG. 4 schematically illustrates the operation of the buffer memory in microcache mode.

FIG. 4 is a flow diagram schematically illustrating the operation of the buffer memory 18 in microcache mode. At step 34, the processing waits until instruction data needs to be read. At step 36, a determination is made as to whether there is a match with the memory address of the instruction data currently stored within the buffer memory 18. If there is such a match, then the instruction data is supplied from the buffer memory 18 without accessing the instruction cache 6 and this is done at step 38. The ability to avoid accesses the main instruction cache 6 advantageously reduces power consumption.

If there is no match with the buffer address at step 36, then step 40 determines whether there is a match with one of the microTAGs associated with the instruction cache 6. Such microTAGs store an indication of the cache way storing a particular piece of instruction data and accordingly if such a match is detected at step 40 then step 42 can supply the relevant instruction data from the cache way indicated without having to access all of the cache ways of the instruction cache 6. The use of microTAGs is optional, but does help to reduce power consumption.

If no match occurs at step 40, then step 44 performs a full matching operation with the cache main TAGs. Since microcache mode is active when there is a loop and the loop sequence has been executed (at least) once, the data should always be present in the main cache.

It will be appreciated that the steps 36, 40 and 44 are illustrated in the flow diagram of FIG. 4 as sequential whereas in practice when implemented in hardware these matching operations may be conducted in parallel, or at least in an overlapped fashion to reduce cycle times.

Another factor which may be relevant in some embodiments concerns "memory attributes" settings associated with certain memory regions. (e.g. cachability of the memory region of the loop). If the loop is in a Non-Cacheable region, then the buffer should not be turned into microcache mode or it would violate the "non-cacheability" rule.

Depending on the implementation, if the loop is in a non-cacheable region, there are several choices:

1—prevent the loop detector detecting this as a loop (=>this means that the loop detector would not be in the Prefetch Control, because it would need to have the cachability information, which is held in the instruction cache 2—let the loop detector detect the loop, but prevent the buffer control from switching into microcache mode.

3—let the loop detector detect the loop, let buffer control switch into microcache mode, but prevent any hit in the microcache buffer (and in the µTAG and mainTAG) due to the non-cachability.

4—don't take the memory attributes into account (this violates the "non-cachability" rule)

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
    a cache memory;
    a buffer memory, coupled to said cache memory, and configured to operate in both a buffer mode and a microcache mode, wherein said buffer mode is a mode buffering instruction data associated with accesses to said cache memory, and said microcache mode is a mode storing instruction data, and accesses to said instruction data are made from said buffer memory without an associated access to said cache memory;
    a loop detector responsive to memory addresses of instructions for detecting program loops; and
    buffer control circuitry, coupled to said loop detector and said buffer memory and responsive to detection of a program loop by said loop detector, for switching said buffer memory from operating in said buffer mode to operating in said microcache mode with instruction data for at least a portion of said program loop being stored within said buffer memory.

2. Apparatus as claimed in claim 1, wherein said loop detector detects a non-sequential fetch of an instruction from a memory address at a backward location relative to normal program flow as indicating a program loop.

3. Apparatus as claimed in claim 2, wherein said loop detector does not detect as a program loop a non-sequential fetch from a preceding memory address requiring a change in memory address value greater than a predetermined range.

4. Apparatus as claimed in claim 1, comprising prefetch circuitry coupled to an external memory and arranged to prefetch instruction data to be executed, said prefetch circuitry including branch prediction circuitry serving as at least part of said loop detection circuitry.

5. Apparatus as claimed in claim 1, wherein, upon entering said microcache mode, said buffer control circuitry controls said instruction data to be read from said cache memory and stored in said buffer memory.

6. Apparatus as claimed in claim 1, wherein, when said program loop comprises more instruction data than can be stored in said buffer memory, a portion of said instruction data comprising said program loop are stored in said buffer memory and a remainder of said instruction data comprising said program loop are stored in said cache memory.

7. Apparatus as claimed in claim 1, wherein said buffer memory stores one or more values indicative of memory addresses of said instruction data stored in said buffer memory when operating in said microcache mode.

8. Apparatus as claimed in claim 1, wherein when operating in said buffer mode said buffer memory functions as one or more of:
    (i) a linefill buffer to store instruction data fetched from an external memory to be stored into said cache memory upon a cache miss; and
    (ii) a prefetch buffer to store instruction data speculatively fetched from said external memory based upon predictions of instruction data to be accessed; and
    (iii) a decoupling buffer to store instruction data read from said cache memory for execution.

9. Apparatus as claimed in claim 8, wherein when operating as a prefetch buffer some instruction data speculatively fetched to said buffer memory is not written to said cache memory.

10. Apparatus for processing data, said apparatus comprising:
    a cache memory means for storing instruction data;
    a buffer memory means coupled to said cache memory means, said buffer memory means configured to operate in a buffer mode and in a microcache mode
    wherein in said buffer mode said buffer memory means comprises a means for buffering instruction data associated with accesses to said cache memory means,
    and in said microcache mode said buffer memory means comprises a means for storing instruction data, where accesses to said instruction data are made from said buffer memory means without an associated access to said cache memory means;
    loop detector means for detecting program loops in response to memory addresses of instructions; and
    buffer control means, coupled to said loop detector means and said buffer memory means, for switching, in response to detection of a program loop by said loop detector, said buffer memory means from operating in said buffer mode to operating in said microcache mode with instruction data for at least a portion of said program loop being stored within said buffer memory means.

11. A method of processing data, said method comprising the steps of:
    storing instruction data within a cache memory;
    storing instruction data within a buffer memory, said buffer memory coupled to said cache memory and arranged to operate in a buffer mode and in a microcache mode, wherein said
    buffer mode is a mode including the step of buffering instruction data associated with accesses to said cache memory
    and said microcache mode is a mode including the step of storing instruction data, where accesses to said instruction data are made from said buffer memory without an associated access to said cache memory;
    in response to memory addresses of instructions, detecting program loops; and
    in response to detection of a program loop, switching said buffer memory from operating in said buffer mode to operating in said microcache mode with instruction data for at least a portion of said program loop being stored within said buffer memory.

12. A method as claimed in claim 11, wherein a non-sequential fetch of an instruction from a memory address at a backward location relative to normal program flow is detected as indicating a program loop.

13. A method as claimed in claim 12, wherein a non-sequential fetch from a preceding memory address requiring a change in memory address value greater than a predetermined range is not detected as a program loop.

14. A method as claimed in claim 11, comprising prefetching instruction data to be executed and performing branch prediction as at least part of said step of detecting.

15. A method as claimed in claim 11, further comprising, upon entering said microcache mode, controlling said instruction data to be read from said cache memory and stored in said buffer memory.

16. A method as claimed in claim 11, wherein, when said program loop comprises more instruction data than can be stored in said buffer memory, storing a portion of said instruction data comprising said program loop in said buffer memory and storing a remainder of said instruction data comprising said program loop in said cache memory.

17. A method as claimed in claim 11, wherein said buffer memory stores one or more values indicative of memory addresses of said instruction data stored in said buffer memory when operating in said microcache mode.

18. A method as claimed in claim 11, wherein when operating in said buffer mode said buffer memory functions as one or more of:
   (i) a linefill buffer to store instruction data fetched from an external memory to be stored into said cache memory upon a cache miss; and
   (ii) a prefetch buffer to store instruction data speculatively fetched from said external memory based upon predictions of instruction data to be accessed; and
   (iii) a decoupling buffer to store instruction data read from said cache memory for execution.

19. A method as claimed in claim 18, wherein when operating as a prefetch buffer some instruction data speculatively fetched to said buffer memory is not written to said cache memory.

20. Apparatus for processing data, said apparatus comprising:
   a cache memory;
   a buffer memory, coupled to said cache memory and configured to operate in either:
      (i) a buffer mode buffering instruction data associated with accesses to said cache memory; or
      (ii) a microcache mode storing instruction data, accesses to said instruction data are made from said buffer memory without an associated access to said cache memory;
   a loop detector responsive to memory addresses of instructions to detect program loops; and
   buffer control circuitry, coupled to said loop detector and said buffer memory and responsive to detection of a program loop by said loop detector, to switch said buffer memory from operating in said buffer mode to operating in said microcache mode with instruction data for at least a portion of said program loop being stored within said buffer memory, wherein, upon entering said microcache mode, said buffer control circuitry controls said instruction data to be read from said cache memory and stored in said buffer memory.

21. A method of processing data, said method comprising the steps of:
   storing instruction data within a cache memory;
   storing instruction data within a buffer memory coupled to said cache memory and arranged to operate in either:
      (i) a buffer mode buffering instruction data associated with accesses to said cache memory; or
      (ii) a microcache mode storing instruction data, accesses to said instruction data being made from said buffer memory without an associated access to said cache memory;
   in response to memory addresses of instructions, detecting program loops; and
   in response to detection of a program loop, switching said buffer memory from operating in said buffer mode to operating in said microcache mode with instruction data for at least a portion of said program loop being stored within said buffer memory, further comprising, upon entering said microcache mode, controlling said instruction data to be read from said cache memory and stored in said buffer memory.

* * * * *